United States Patent [19]

Martin et al.

[11] Patent Number: 4,847,791

[45] Date of Patent: Jul. 11, 1989

[54] TIMEKEEPING SYSTEM

[76] Inventors: Joseph H. Martin, 10841 Meadow Glen Way; Carl A. Hammons, 10873 Meadow Glen Way, both of Escondido, Calif. 92026

[21] Appl. No.: 408,259

[22] Filed: Aug. 16, 1982

[51] Int. Cl.$^4$ .......................... G07C 1/04; G09D 9/32
[52] U.S. Cl. .................................... 364/554; 377/20; 364/188; 346/20; 346/82
[58] Field of Search ............... 364/188, 189, 401, 402, 364/406, 419, 464, 468, 554, 569, 200 MS File; 346/20, 26, 82; 377/20, 26

[56] References Cited

U.S. PATENT DOCUMENTS

| | | | |
|---|---|---|---|
| 3,351,912 | 11/1967 | Collom et al. | 340/172.5 |
| 3,593,008 | 7/1971 | DeWitt et al. | 235/151 |
| 3,648,243 | 3/1972 | Wiggins | 340/152 |
| 3,660,645 | 5/1972 | Lecht et al. | 235/152 |
| 3,665,165 | 5/1972 | Strandberg, Jr. et al. | 235/92 T |
| 3,703,630 | 11/1972 | Gelder | 364/401 |
| 3,775,752 | 11/1973 | Lorenzo | 364/200 |
| 3,846,702 | 11/1974 | Dziki et al. | 324/186 |
| 4,063,071 | 12/1977 | Willmann et al. | 377/20 |
| 4,164,038 | 9/1979 | Nachtigal | 364/705 |
| 4,170,015 | 10/1979 | Elliano et al. | 377/26 |
| 4,340,808 | 7/1982 | Donohoo | 377/20 |
| 4,358,777 | 11/1982 | Bille | 346/82 |
| 4,409,657 | 10/1983 | van der Lely | 364/406 |
| 4,438,326 | 3/1984 | Uchida | 235/379 |

FOREIGN PATENT DOCUMENTS 0645341 7/1962 Canada ................................. 364/401

OTHER PUBLICATIONS

Purnell, *Shop Floor Data Acquisition and Communication*, Machinery & Production Engineering, Mar. 12, 1975, pp. 240-245.

*Primary Examiner*—Gary V. Harkcom
*Assistant Examiner*—H. Herndon
*Attorney, Agent, or Firm*—Duane C. Bowen

[57] ABSTRACT

A system to process employee and job data, in a shop having a number of mechanic employees and a number of machines, including at least a first employee-input station, a second timekeeping station, and a third management station. A printer and a computer at the second station includes a program in the computer calculating from employee clocking of time and jobs the employee hours, the time spent on each job, accumulated job hours, and percentages of completions of jobs. Cathode Ray Tube (CRT) displays and keyboards are at each station. The keyboards at the first and third stations being special purpose keyboards primarily concerning employee clock-in and clock-out on each job and several cost-class keys that can be associated with various jobs. The program computes different costs on jobs depending on the use of cost-class keys. The first station has a listing of jobs and employees by character. The program limits access to information stored in the computer depending on the inquiring station and the inquiring person.

16 Claims, 4 Drawing Sheets

TIMEKEEPING SYSTEM

BRIEF SUMMARY OF THE INVENTION, BACKGROUND AND OBJECTIVE

Our invention relates to a timekeeping system to record, calculate and display employee and job information in an establishment having a number of employees and having a number of different types of operations engaged in by the employees.

The system is especially useful in a shop having a number of mechanic employees and having a number of different types of machines operated by those employees.

In many industrial and business operations, management doesn't know the cost of various jobs in terms of workers' time and other costs. From the viewpoint of many workers, such as the craftsmen in machine shops, getting the job done is the first priority. Paperwork is viewed as management's responsibility. The workers first may not like record keeping. However, in many businesses and industrial operations, such as a contract machine shop where profit is made on labor, not necessarily on materials, an accurate accounting of time spent on each of the many jobs in progress is essential. Since the price of a job in such contract shop is usually fixed before the job is started, accurate record keeping won't help make a profit on that job, but good records will indicate if the job should be run again for the same price. Sound records also help provide estimators with more accurate information, for future estimates, as to what machines were used, who operated them and how long it took. If an identical job is run at a later date, an exact price can be determined in advance. In different jobs, estimates for contract quoting are improved. Determining which jobs are profitable and which are not is understandably important. Most contract shops would show a larger profit at the end of the year by doing twenty percent less work—if they knew which jobs not to do.

Keeping track of who spent how much time on which job is the most difficult part of determining the ultimate profitabilities of jobs. It seems simple until there are, for example, thirty-five employees working on sixty-five different jobs, each of which have multiple operations. Each operation is done as the equipment needed becomes available, creating a series of delays which make accurate record keeping difficult. If the record keeping system in use is complicated, cumbersome, or inconvenient, in most cases the employees will not use it consistently or will avoid it all together, making accurate cost figures virtually impossible to obtain.

The objectives of our invention, therefore, include: providing a time-keeping system for keeping of such records that is easy to use, that provides information of such accuracy as is needed (which could vary from rough information to more exact accounting) that is economical to procure; and providing additional desirable features in a time keeping system such as restricting information depending on the person operating a terminal or which terminal is used, such as having the capability to respond as to the status of any job at any time, such as doing normal daily timekeeping with the same system for payroll purposes, such as checking attendance, and such as sounding rest and lunch breaks and also accounting for the times involved, which normally would not be charged to the jobs.

Our invention will be best understood, together with additional advantages and objectives thereof, when read with reference to the drawings.

Better record keeping is important to successful business as long as the cost of keeping those records isn't excessive. The present invention facilitates better record keeping in some types of industries, businesses, etc. It is more than just a time clock connected to a computer. The invention concerns an important part of running certain operations, such as a contract shop which will give accurate job information in seconds and which will create complete job files. The system features simple-to-use input stations which are "operator-designed."

Industrial and business establishments frequently have jobs that have been run and rerun for years at a loss simply because management didn't know the time taken on those jobs. The present system is adapted to print out an accounting of the status of each job daily upon simple request. Management can know who worked on each job and for how long. Since each employee's hourly wage can be programmed in as well as the cost of operating each different machine, the daily printout can give the total labor cost of each job to date. Management needs only add the current cost of materials used to get a totally accurate figure to compare with the bid. In a facility like a law firm, mostly employee hours will be involved on many jobs whereas in a machine shop both machine time and materials are also important. Upon completion of a job, our system will give information if that job is profitable or needs to be rebid in the future.

Another feature of our record-keeping system is at any time, management can call up on a monitor the status of any job in progress and get information which is literally up to the minute. The supervisor can tell who has worked or is working on the job, how much time has been spent and the total cost of that time. The results are displayed in seconds.

Figure 1:
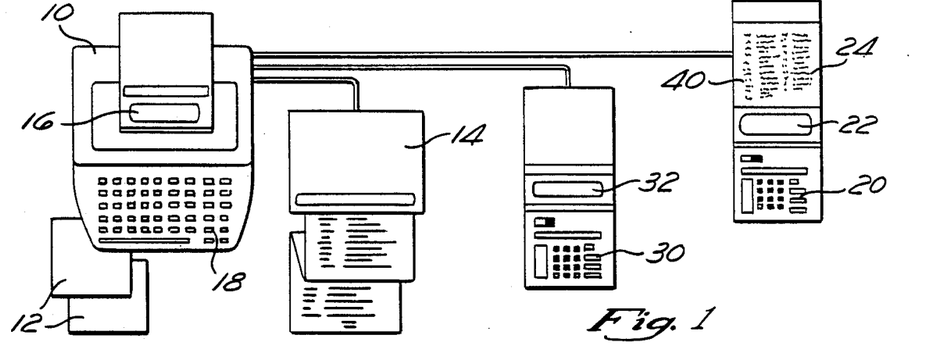
FIG. 1 is a schematical presentation of a specific embodiment of our invention.
Figure 2:
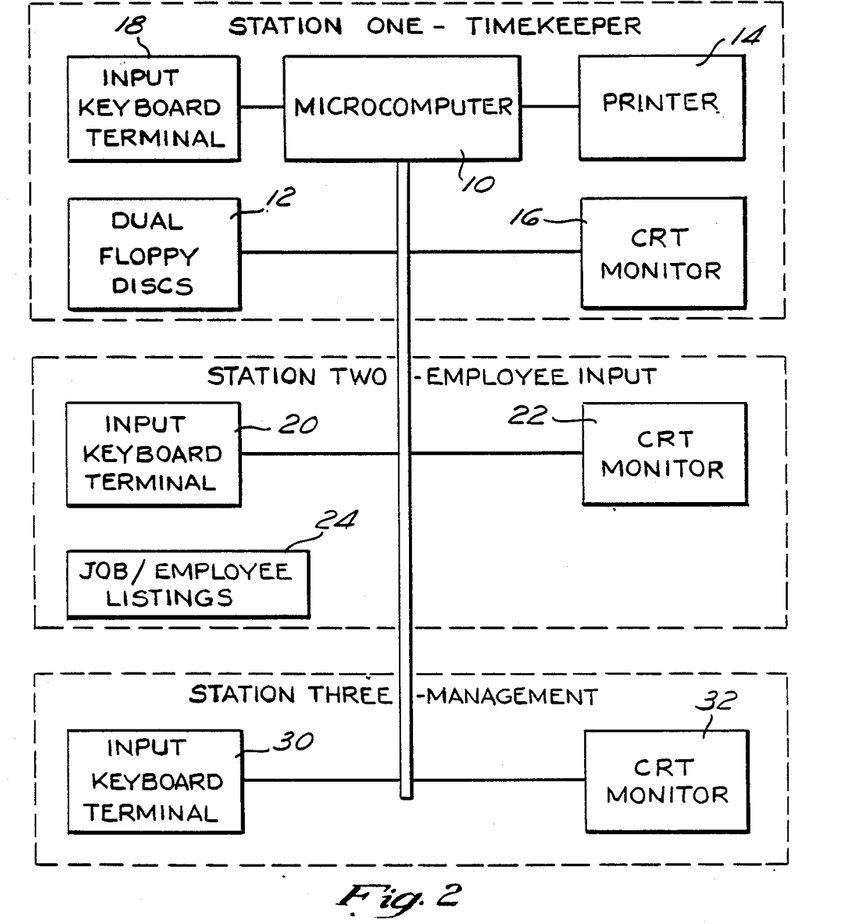
FIG. 2 is a diagrammatical presentation.

FIGS. 1 and 2 show equipment at Timekeeper Station One, at Employee-Input Station Two, and at Management Station Three.

The equipment at Timekeeper Station One includes a microcomputer 10 having a record-keeping program adapted to conduct the operations described herein, storage means 12 such as dual floppy discs and a printer 14 used to print information from computer 10. Microcomputer 10 usually will have its own cathode ray tube monitor 16. We intend to use a conventional microcomputer 10 which will have a conventional complete keyboard 18 normal to such equipment.

The equipment at Employee-Input Station Two includes a special input keyboard terminal 20, a cathode ray tube monitor 22, and job/employee listings 24.

The equipment at Management Station Three includes a special input keyboard terminal 30 and a cathode ray tube monitor 32.

Computer 10 is specified to be a microcomputer merely because what is presently known as a microcomputer has ample capability and capacity to provide the functions herein specified. However, generically, item 10 is merely a type of computer, which may be described as other than a microcomputer as time passes in the future and as equipment changes. Substitutes for microcomputer 10 would be spare capacity of a larger computer, leased services of a distant computer, a computer used for additional purposes such as general accounting, word processing, inventory, some engineering functions, etc.

Those skilled in the art of computers will understand the selection of computer 10, the programming of computer 10, and the selection of storage 12, printer 14, etc. Current appropriately sized microcomputers are available from Apple, Tandy Corporation, Commodore International Ltd, IBM, Texas Instruments, Atari, Hewlett-Packard, and others. A variety of printers 14 are available. Microcomputers 10 usually have built-in CRT monitors 16. A conventional microcomputer keyboard 18 can be used for several reasons: (a) it usually will be available as a part of computer 10, (b) a variety of functions will be needed from the keyboard by the timekeeper or whoever else does the basic operations with computer 10 for the company such as loading programs, changing programs, inputting and changing jobs, inputting and changing employees, inputting and changing cost information, controlling daily and other printouts, performing any other functions microcomputer 10 is desired for which may involve business matters not involving time and job keeping, (c) there is no problem of limiting access to information on the part of the basic operator or timekeeper who will need to be adequately trained for the functions mentioned above so there would not be a problem of the timekeeper being confused by a full keyboard.

Input keyboard terminals 20, 30 are preferably special purpose keyboards, limited to certain timekeeping functions. Terminals 20, 30 will be described in more detail later. Cathode ray tubes 22, 32 can be commercially available 9" TV monitors or the like.

The application to which the equipment was initially applied was a contract machine shop. Employee-Input Station Two is in the shop area and frequently can have the same type of location as timeclocks. Those familiar with such plants will understand the installation of Station Two either in an open shop area or an adjacent enclosure separate from what might be termed "office areas" such as management offices or offices of timekeeper, accounting, clerical employees, etc. The plant will have dirt, oil, grease, metal particles, air contamination, etc., which usually will be segregated from office areas to keep it away from sensitive office equipment (which could not withstand such contaminants), to avoid soiling paperwork, etc. It would be undesirable to contaminate office areas by having machinists and the like using a terminal in office areas as they would bring contamination with them, extra time would be taken in getting into office areas, etc.

Figures 3, 4:
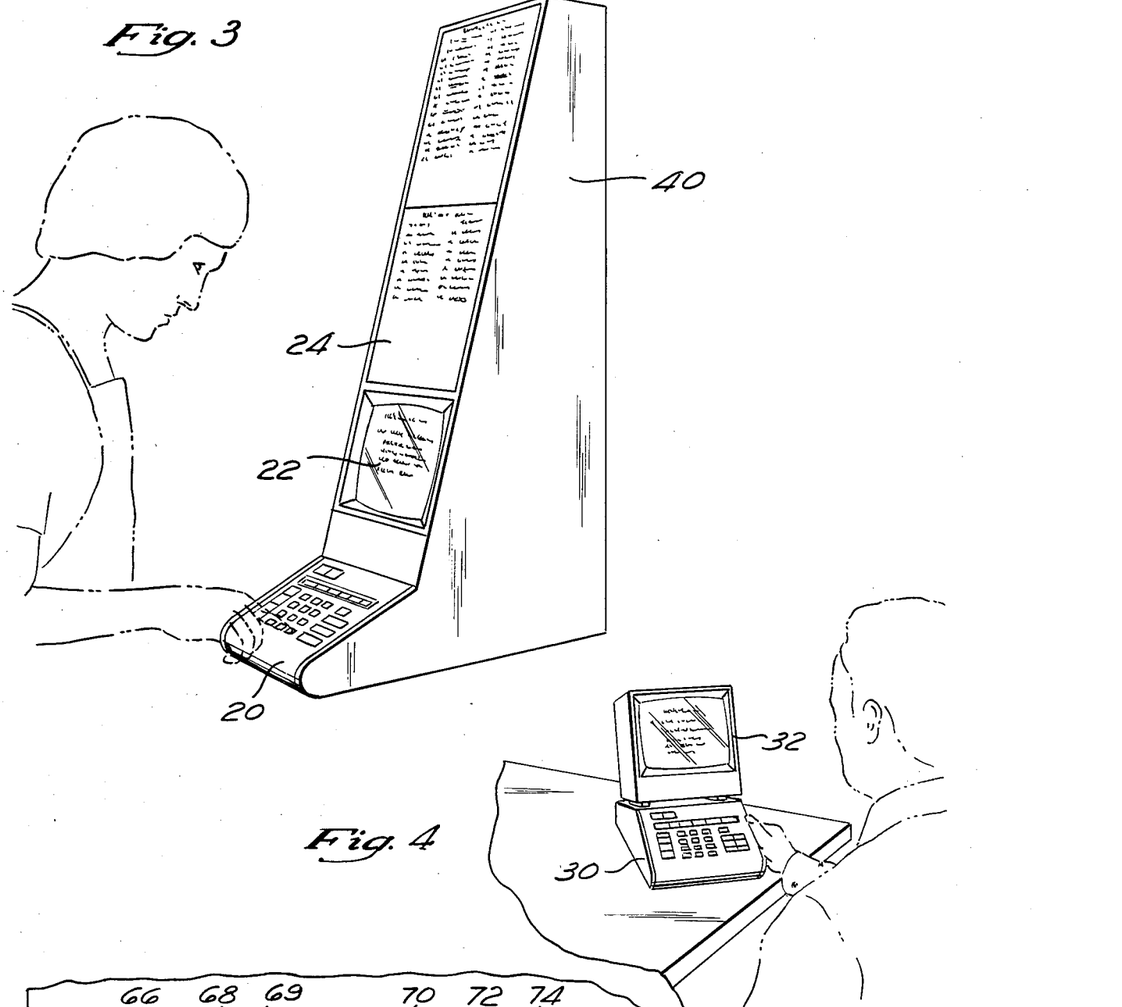
FIG. 3 is a perspective view of equipment at an employee-input station including a wall-mounted cabinet.
FIG. 4 is a perspective view of equipment at a management station.

The equipment at Employee-Input Station Two, including terminal 20, monitor 22, and job/employee listings 24, should be suitable for rugged shop duty and preferably all will be housed in a wall-mounted cabinet 40 to protect them from both physical abuse and from contaminants. Preferably, keyboard 20 will have flush "touch surface" keyboards which are easy to keep clean. Cabinetwork should be constructed of metal and should be built heavy and solid.

Figure 5:
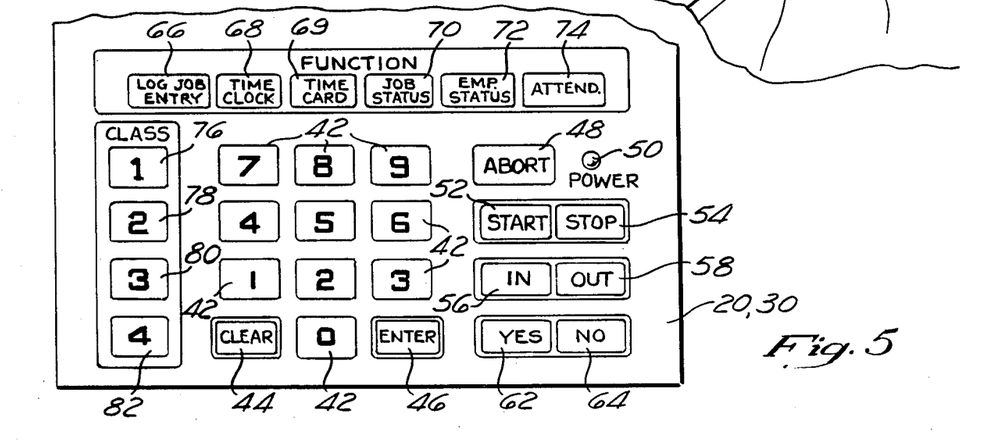
FIG. 5 is an enlarged view of keyboard used in employee-input and management terminals.

Lists 24, which may be mounted on cabinet 40 above keyboard 20 and monitor 22, can list just jobs or both jobs and employees, along with characters associated with each (numeric and/or alphabetic characters) to be input into the system through the keys of the keyboard 20. The lists may be typewritten or will be otherwise changeable as jobs and personnel change. The lists could include other material relating to costs but may be limited to jobs and employee identifications in order to simplify the employee's task in entering data, i.e., he only has to verify job and employee characters from lists 24. If other information needs to be entered, such as cost classes (later explained), this may be given to the employee by supervision rather than to require him to ascertain cost classes from lists 24. In the keyboard 20, as best shown in FIG. 5, numerical keys are provided and alphabetical keys are not provided, so jobs and employees would be identified by numbers, which probably would be three or four digit numbers.

The system was designed to be operated by shop and management personnel at Stations Two and Three with only brief training in operating keyboards 20, 30 and to simplify their tasks even further, the system will prompt the user to enter the correct information by displaying questions on the TV monitor at selected steps thus guiding the user through each step. Even the timekeeper needs little additional training besides basic competency in microcomputer or word processor operations. In fact, all timekeeping operations may be handled by one person in about one to two hours a day in a shop of perhaps 20–50 people, leaving the person free for other tasks the rest of the time. A program would be provided along with instructions, as is the case with word processors and the like.

The basic employee-input and management keyboards 20, 30 will be described next. They could be different but in the prototype system they were identical and that design has worked well.

Numerical keys 42 will be understood to have a usual function in input of data by numerical designations. Keys 42 are shown to have 0–9 keys. Clear key 44 has the usual function of clearing incorrect punching of keys. Enter key 46 is provided to trigger input of numbers punched with numerical keys 42.

Abort key 48 is used with a computer in which entries end in a branch system and the system needs to be brought back to zero. The abort is a function of particular equipment and programs, as will be understood by those skilled in the art, and won't necessarily be used. Light 50 indicates the system is in operation. Start key 52 and stop key 54 relate to scrolling when information is being scanned on monitors 22, 32. Need for scrolling depends on the program, equipment and functions to be performed at Stations Two or Three and scrolling will be understood by those skilled in the art. In key 56 and Out key 58 relate to an employee checking in and out. Yes key 62 and No key 64 depend on the program and equipment when a question appears on monitors 22, 32 and such yes-no features will be understood by those skilled in the art.

Log job entry key 66 will be used when an employee is logging a job. Time clock 68 will be used when the employee is checking in or out for the day. Keys 66, 68 relate to keys 56, 58 in that if the employee were checking in for the day the employee would punch Time Clock button 68 and In button 56, whereas if the employee were entering he was starting or stopping a job the employee would punch Log Job entry button 66 and In button 56 or Out button 58. Time Card key 69 can be used by the employee when he wants to check his hours for the pay period. Again, monitor 22 will display questions to prompt the employee to make the correct entry during each step to properly log the job.

Job status key 70 would be used in conjunction with an inquiry to computer 10 of the status on a particular job. The program for computer 10 may restrict job status information depending on whether the employee-input keyboard 20 were used (limited access) or the management keyboard 30 were used (unlimited access) and depending on the employee number used (hourly payroll limited access or management unlimited access). For example, it might be desired to restrict accumulated or other cost information to the employee. The same might be true of job percentage completed data.

Employee Status key 72 is used in connection with ascertaining what job is being charged with an employee's time at the moment.

Attendance key 74 can be used by a supervisor to ascertain what employees are in attendance or which employees are in attendance that were expected in a particular shift. The latter function is preferred as it shows not only those in attendance but also those missing.

Class keys 76, 78, 80, 82 (Classes 1, 2, 3 and 4) can be used to give rough information on costs. For example, Class 3 might designate cost bracket involving a $12/hour employee operating a $80,000 numerically controlled machine, whereas Class 1 might designate a cost bracket including a $4/hour employee operating a drill press.

Class keys 76–82 are provided although it is understood that management in a particular plant or office may decide to use one of several different employee/job recording and calculating systems, such as follows:

(1) Hours Worked. Only the employee hours associated with each job will be input on keyboard 20. As it is simple to store actual hourly pay rates, the calculations will be usually in terms of actual pay figures rather than average pay figures. The cost figures calculated will not include machine or equipment cost.

(2) Quality of Time. Class keys 1, 2, 3 and 4 are used to designate cost brackets which may include hourly rate of worker and hourly cost of the machine or the like. Rather than to require the worker to look this up from information like lists 24, a supervisor may tell the employee what class to use. The resulting calculation may be rough but may be close enough for the shop's purposes.

(3) Exact Costs. In this mode of operation, the employee's exact wage and each machine's exact operating cost can be used in the system to get more accurate costs. The wage can be punched in as an hourly figure or the employee number can be used to trigger the hourly wage figure from storage. The machine cost can be punched in or the machine number can be used to trigger the hourly machine cost figure from storage, as will be understood by those skilled in the art. When employees are on break, the program automatically can charge their time to overhead.

It will be understood that connection for input from keyboards 20, 30 to computer 10 and for output from computer 10 to monitors 22, 32 usually will be accomplished with coaxial cables.

A typical day's operation with our system could include the following:

| | |
|---|---|
| 0640–0650 | Timekeeper starts system and enters new jobs. |
| 0650–0700 | Employees clock in. Time is filed separately according to the program and information is directly fed into a payroll program. |
| 0700–0705 | Employees with new jobs enter into the system. |
| 0710 | Shop foreman runs attendance check and discovers a machine operator hasn't shown up. Schedule is quickly restructed to keep expensive production machine running. |
| 0815 | Company manager arrives, checks attendance and scans jobs in-progress. |
| 0845 | System sounds morning break and enters all employees on overhead. |
| 0900 | System sounds end of break and re-enters time on jobs. |
| 0918 | Customer calls checking on his job. Manager enters job number and within seconds has all pertinent information displayed at manager's desk. |
| 0925 | Shop supervisor takes Past due list and 80% of More lists (a list of jobs is printed each day containing jobs that are past due or have used 80% of their estimated labor or cost) and checks expected completion dates. |
| 0930–1400 | Employees keep updating system as new jobs are assigned. Computer sounds lunch break and afternoon break. |
| 1430 | Manager meets with customer to explain price increase. With the aid of a well documented job folder obtained through our system and a quick explanation of how the information was obtained, customer agrees to a 15% price increase. |
| 1440 | Employee check his hours for the week. |
| 1530 | Employees clock out. Timekeeper operates system to then print hard copy on each employee and job in the day's transactions. Job transactions are then put in individual files on each job with pertinent information added in the "remarks" section if needed. |
| | All during the day previously recorded information has been used for estimating, scheduling and running the business. |

Set forth below are some examples of typical daily job reports from printer 14.

(1) Actual Daily Job Report on Job No. 283. Operation 3 is being worked on that day, is based on complete actual costs of employees and machine; although the printout doesn't show calculations:

SMITH MFG. - DAILY JOB REPORT

DATE: 3-3-82  DUE DATE: 3-15-82
JOB NO.: 283   OPERATION: 03   P/O NO.: 105-684-283
DESCRIPTION: Handles

| WORK STATION | EMPLOYEE | CLOCK IN | CLOCK OUT | TOTAL HRS/MIN | COST |
|---|---|---|---|---|---|
| 33 | Olsen S. | 09.03 | 16.00 | 6/02 | $110.35 |
| 52 | Ward K. | 11.15 | 15.35 | 3/40 | $137.88 |
| | | TODAYS TOTAL | | 9/42 | $248.23 |
| | | TOTAL OPERATION 03 | | 12/12 | 313.25 |

|  |  | TOTAL JOB TO DATE | 84/30 | 1943.50 |
|  |  | EST. JOB TOTAL | 116/00 | 3132.00 |
|  |  | % COMPLETED | 72.8% | 62.05% |

Any pertinent information regarding this job is to be recorded on the backside of this report for future use.

(2) Daily Job Report on Job No. 283, Annotated with Calculations Performed Internally of Microcomputer 10. The actual calculated costs per hour of machines are shown at left, the actual calculated costs per hour of employees are shown next, deductions for breaks shown, etc. The work station identifies the machine used. Note in the summary, figures are given both for the total job and for operation 3:

SMITH MFG. - DAILY JOB REPORT

DATE: 3-3-82  DUE DATE: 3-15-82
JOB NO.: 283   OPERATION: 03   P/O NO.: 105-684-283
DSSCRIPTION: Handles

| WORK STATION | EMPLOYEE | CLOCK IN | CLOCK OUT |  | TOTAL HRS/MIN |  | COST |
|---|---|---|---|---|---|---|---|
| 33 (12/hr) | Olson S. | 09.03 (Less 15 min Break) (Less 30 min Lunch) (Less 10 min Break) | 16.00 | = | 6/02 (× 18.30) | = | $110.35 |
| 52 (27/hr) | Ward K. | 11.15 (Less 30 Min Lunch) (Less 10 Min Break) | 15.35 | = | 3/40 (× 37.57) | = | $137.88 |
|  |  | TODAYS TOTAL |  |  | 9/42 |  | $248.23 |
|  |  | TOTAL OPERATION 3 |  |  | 12/12 |  | 313.25 |
|  |  | TOTAL JOB TO DATE |  |  | 84/30 |  | 1943.50 |
| { Job to Date (÷ Est. Job Total) } = | EST. JOB TOTAL |  |  | 116.00 |  | 3132.00 |
|  |  | % COMPLETED |  |  | 72.8% |  | 62.05% |

(3) Actual Daily Job Report on Job No. 289. Costs are based on four cost class brackets 1, 2, 3 and 4, and are approximate. Face of report does not show calculations. Job 289 either has only one operation or management has decided not to break down the report by operations:

SMITH MFG. - DAILY JOB REPORT

DATE: 3-3-82  DUE DATE: 3-15-82
JOB NO.: 289   P/O NO.: 105-684-289
DESCRIPTION: Rollers

| CLASS NUMBER | EMPLOYEE | CLOCK IN | CLOCK OUT | TOTAL HRS/MIN | COST |
|---|---|---|---|---|---|
| 1 | Reed R. | 10.30 | 14.05 | 3/05 | $92.40 |
| 4 | Waverly B. | 07.30 | 16.00 | 8/00 | 96.00 |
| 3 | Johnson G. | 13.15 | 15.45 | 2/20 | 46.60 |
|  |  | TODAYS TOTAL |  | 13/25 | $235.00 |
|  |  | TOTAL JOB TO DATE |  | 31/15 | 815.30 |
|  |  | EST. JOB TOTAL |  | 50/00 | 1200.00 |
|  |  | % COMPLETED |  | 62.5% | 67.9% |

(4) Daily Job Report on Job 289, Annotated with Calculations Performed Internally of Microcomputer 10. The calculations are based on classes which represent composites of machine cost/hour and employee cost/hour:

SMITH MFG. - DAILY JOB REPORT

DATE: 3-3-82  DUE DATE: 3-15-82
JOB NO.: 289   P/O NO.: 105-684-289
DESCRIPTION: Rollers

| CLASS NUMBER | EMPLOYEE | CLOCK IN | CLOCK OUT | TOTAL HRS/MIN | COST |
|---|---|---|---|---|---|
| 1 (= 1.5) | Reed R. | 10.30 (Less 30 Min Lunch) (1.5 × Time × $20 Unit) | 14.05 | 3/05 | $92.40 |
| 4 (= .6) | Waverly B. | 07.30 (Less 15 Min Break) (Less 30 Min Lunch) (Less 10 Min Break) (.6 × Time × $20 Unit) | 16.00 | 8/00 | 96.00 |
| 3 (= 1.0) | Johnson G. | 13.15 (Less 10 Min Break) (1.0 × Time × $20 Unit) | 15.45 | 2/20 | 46.60 |

Note: The system user will have to determine the weighted factor for each class, which would be multiplied by the hours to give units. A cost per unit would also have to be determined by the system user which would give a reasonable accurate job costs.

|  |  | TODAYS TOTAL | 13/25 | $235.00 |
|---|---|---|---|---|
|  |  | TOTAL JOB TO DATE | 31/15 | 815.30 |
| { Job to date } = | EST. JOB TOTAL | 50/00 | 1200.00 |
|  |  | % COMPLETED | 62.5% | 67.9% |

-continued

| | ($\div$ Est. Job Total) | | |
|---|---|---|---|

(5) Actual Daily Job Report on Job 420. The calculation only concerns hours expended on the job. The management has decided only to account for time because of one or more of the following considerations: (a) simplicity for employees, timekeeper and management, (b) other means are used to account for machine expenses, (c) management is satisfied with only accounting for time on the job for some reason, i.e., other expenses correlate with time expended within the degree of accounting accuracy needed:

SMITH MFG. - DAILY JOB REPORT

DATE: 3-3-82  DUE DATE: 3-15-82
JOB NO.: 420     P/O NO.: 120-917-420
DESCRIPTION: Tailstock Cases

| EMPLOYEE | CLOCK IN | CLOCK OUT | TOTAL HRS/MIN |
|---|---|---|---|
| Agular J. | 08.45 | 15.50 | 6/50 |
| Vanderhiden J. | 11.10 | 14.15 | 2/35 |
| Pennington A. | 09.08 | 15.30 | 5/27 |
| | TODAYS TOTAL | | 14/12 |
| | TOTAL JOB TO DATE | | 22/10 |
| | EST. JOB TOTAL | | 34/00 |
| | % COMPLETED | | 65.2% |

(6) Daily Job Report on Job 420, Annotated with Calculations Performed Internally of Microcomputer 10. The calculations include deductions of time for breaks and calculation of the ratio of time expended to estimated total time for the job:

SMITH MFG. - DAILY JOB REPORT

DATE: 3-3-82  DUE DATE: 3-15-82
JOB NO.: 420     P/O NO.: 120-917-420
DESCRIPTION: Tailstock Cases

| EMPLOYEE | CLOCK IN | CLOCK OUT | TOTAL HRS/MIN |
|---|---|---|---|
| Agular J. | 08.45 | 15.50 | 6.50 |
| | (Less 15 Min Break) | | |
| | (Less 30 Min Lunch) | | |
| | (Less 10 Min Break) | | |
| Vanderhiden J. | 11.10 | 14.15 | 2/35 |
| | (Less 30 Min Lunch) | | |
| Pennington A. | 09.08 | 15.30 | 5/27 |
| | (Less 15 Min Break) | | |
| | (Less 30 Min Lunch) | | |
| | (Less 10 Min Break) | | |
| | TODAYS TOTAL | | 14.12 |
| | TOTAL JOB TO DATE | | 22/10 |
| | EST. JOB TOTAL | | 34/00 |
| | % COMPLETED | | 65.2 |

$$\left\{ \begin{array}{c} \text{(Job to Date)} \\ \text{($\div$ Est. Job Total)} \end{array} \right\} =$$

The following have been outlined as desirable features of equipment and programs in a prototype system:

1. Use of a three-digit employee number for input but preferably monitors instead will display names.
2. Use of a three-digit job number plus two more digits if needed.
3. Use of job class codes by use of four special keys 76, 98, 80, 82, for four job-category levels, i.e., drill press work class 4 and numerically controlled machines Class 1. Weighted multiplication factors would be used like 0.7 for drill press work and 2.2 for numerically controlled machines.
4. Use of special accounting code for supervisors.
5. Ability to call up on screen job not being worked on.
6. Ability to call up on screen employees not present.
7. Separate data file for time clock functions. This would function like a time clock. A separate desk drive could be run for payroll purposes.
8. Ability for employee to check own hours for weekly payroll period.
9. Ability to scan jobs in which there would be scrolling as long as button 52 was held down.
10. Ability to enter estimated time on jobs.
11. Ability to process a double job entry, meaning a machinist handling two machines (not requiring constant attention) in the same time period.
12. Ability to sound horn such as to start shift, to start and stop breaks, to start and stop lunch and to stop shift.
13. Ability to print all of the operations of a job, which may be termed a "process sheet".
14. Ability to shut system down say at 4:00 and have people clocked out at 5:00 so that daily job reports or other reports can be printed early.
15. Ability to subtract lunch time from day totals and to subtract break time from job and add it to overhead.
16. Ability to add due date to job print out.
17. Ability to treat machine like an employee in accounting for time spent on jobs and in accounting for hourly cost of machine.
18. Ability to print out sheet for each job at the end of day.
19. Ability to prompt the user by asking specific questions on the monitor in order to enter the correct information into the system.

As mentioned above, during each step where it is necessary for the employee to make a decision, the monitor will ask the question to be answered, as for example, after depressing key 66, the computer will ask for employee number, later will ask that the correct employee name be identified, later will ask for the job number, and whether starting or stopping the job.

Figure 6A:
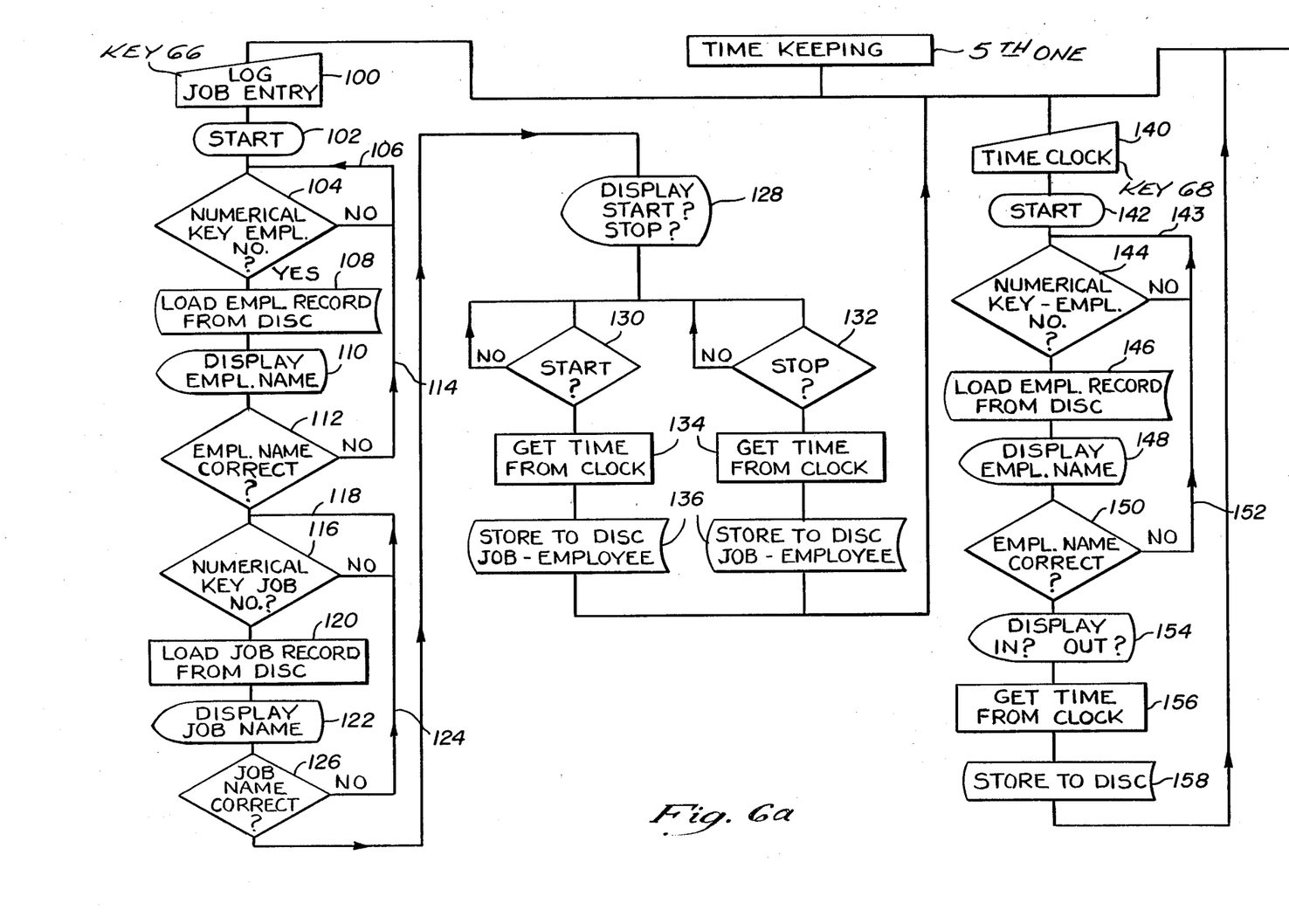
FIGS. 6a and 6b represent a flow chart showing the steps of the program stored in the microcomputer which operates the present invention.

Finally, as shown in the flow chart of FIG. 6 and as stated supra, the first step, block 100, is the starting, block 102, of the system by the timekeeper enabling the Stations one, two and three. In this chart, the initiating steps corresponding to key numbers previously described. Thus, the first step, block 100, entitled "Log Job Entry" corresponds to key 66, "Time Clock", block 140, is identified by key 68, "Time Card", block 160, is identified by keys 56, 58 and 69, "Job Status", block 180, is identified by key 70, "Employee Status", block 204, is identified by key 72 and finally "Attend", block 226, is identified by key 74. In each case, depression of the selected key will start the cycle as shown in the flow chart, for example, key 66, will start the log job entry, block 100. The next step is the entry of the employee number, block 104, and the entry is verified by the information recorded in memory, block 108, and displayed, block 110, as an employee name on the display. If the employee number is not entered, the cycle remains at start, as indicated by the branched line 106. Employee will identify his name, block 112, and if not correct, will be requested to start the cycle over again as identified by branched line 114. If the name is correct, the employee will enter the job number, block 116. If the job number is not entered, the cycle will remain at the display step, block 112, as represented by branch line 118. Upon entry of the job number, the memory is queried, block 120, and displayed, block 122. If the job name is wrong, the employee will be asked to reenter the job number, branch line 124 and block 126, until the correct name is displayed, block 128. Once the correct name is displayed, display will ask whether it is to start charging time, block 130, or to stop charging time, block 132. In either case, the time is entered, block 134, and sent to memory identifying the employee and job number, block 136.

"Time Clock", identified by key 68, block 140, operates in a manner similar to the steps involved in the "Log Job Entry". Upon a depression of key 68, block 140, the cycle is started 142, and the employee number is entered by the employee, block 144. Branch line 143 illustrates the fact that if the employee does not enter his employee number, the system remains on start, block 142. If the employee enters his number, the memory is queried as to the number, block 146, and the employee name corresponding to the entered number is displayed, block 148. If the employee name is incorrect, the employee will be asked via the display to enter the correct name. This is represented by block 150 and branch line 152. Next query to the employee will be whether the time clock is to be timed IN or OUT, block 154. The time will be obtained from the time clock, block 156, and sent to the memory block 158.

Figure 6B:
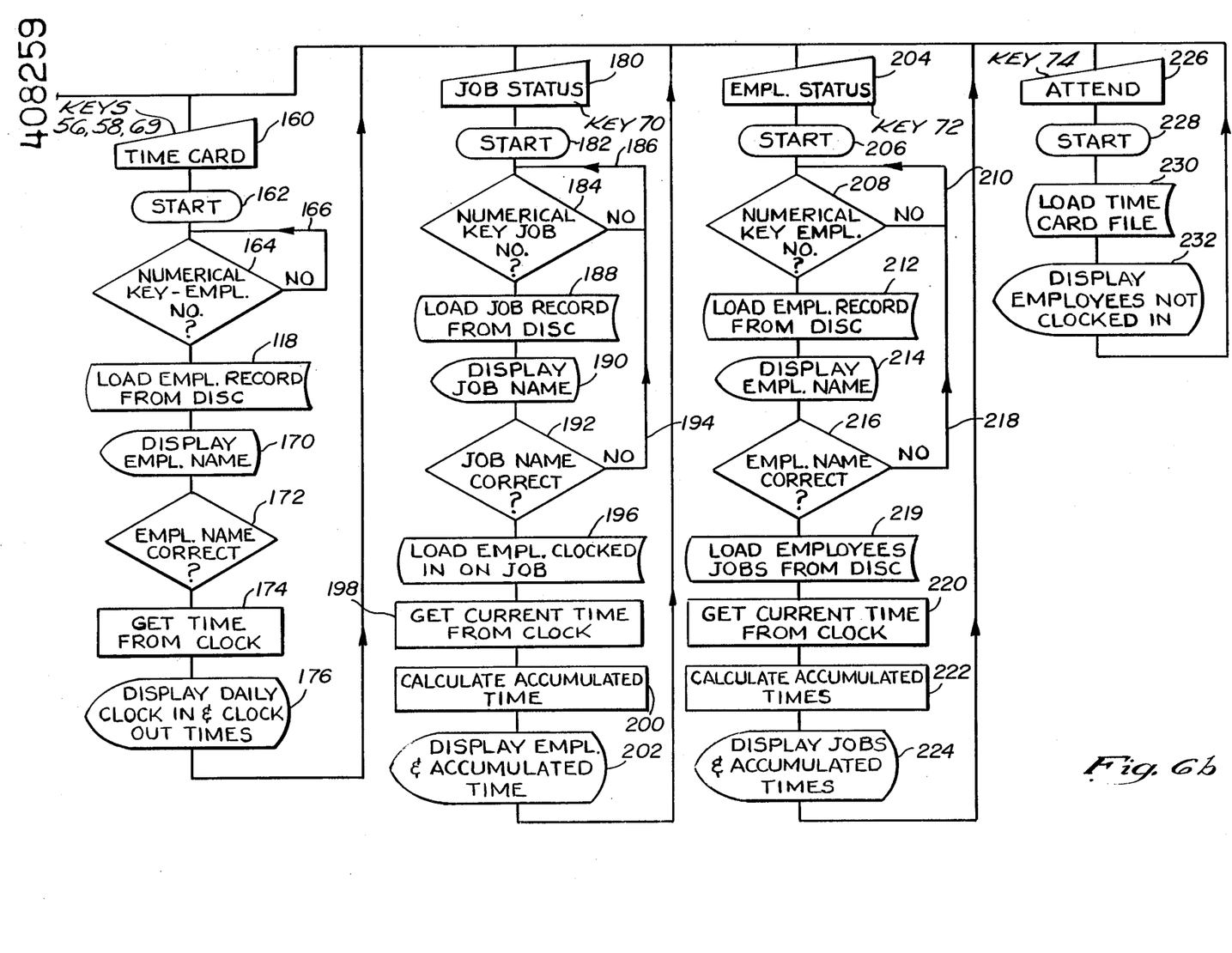

In FIG. 6b, the "Time Card", initiated by keys 56, 58 and 69, is identified by block 160. Depression of any one of these keys will start the system, block 162, and at that time the employee will enter his employee number, block 164. If he does not do so, the cycle remains on "start" as indicated by the branched line 166, as explained in the other steps in the program. The memory is queried, block 118, and a name is displayed, block 170. If the name is correct, block 172, the time is obtained, block 174, and "Clock IN and Clock OUT" times are displayed, block 176. This step can be repeated as often as necessary until the entered number agrees with the display name.

The next program steps are like the prior described steps, namely, key 70 the "Job Status", block 180, which, when depressed, starts the cycle, block 182. The key job number is entered, block 184, but if not, the system remains on "start". See branch line 186. If the job number is entered, the memory is queried, block 188, and the job name corresponding to the entered number appears on the display, block 190. If the job number is not correct, block 192, the cycle is to be repeated from "Start" as represented by branch line 194. If the job name is correct in block 192, employee number is entered into the job, block 196, the clock time is entered, block 198, and accumulated time is calculated, block 200, and displayed as total employee accumulated time, block 202, which is sent to the computer.

Similarly, Employee Status key 72, if depressed, will start the cycle, blocks 204 and 206. The employee number is entered as before, block 208, and if not, the system will remain at "Start", as represented by branch line 210. If the employee number is entered, the memory will be queried, block 212, and the name displayed on the display, block 214. If the employee name is not correct, block 216, the system will return to start, as represented by branch line 218. If the name is correct, the employee's name will be queried at the memory, block 219, together with current clock time, block 220, the times the employee spent on which jobs will be calculated, block 222, and displayed, block 224.

Key 74, when depressed, block 226, will start, block 228, a cycle to display employee attendance by querying the memory file of times and information, block 230, and display the employees not clocked in for the day, block 232. In each case, the employee number and the name are verified and the desired information is displayed such as clock "in" and clock "out" times for employees, employees' accumulated time, or job and accumulated time, and/or daily attendance, as the case may be. All information, of course, is accumulated and continually available at the appropriate station. While there is no actual showing of the input for the job classification keys 76–82, these would be introduced in the job station cycle, if such information is desired, together with suitable verification procedures as shown in connection with employee number, for example. Again, during each step where the calculation is required for information is necessary from the operator, the TV monitor will display the appropriate question so that the computer can make the appropriate calculations regarding costs, status of the particular job, etc.

Having thus described our invention, we do not wish to be understood as limiting ourselves for the exact construction shown and described. Instead, we wish to cover those modifications of our invention that will occur to those skilled in the art upon learing of our invention and which are within the proper scope therof.

We claim:

1. A system to record, calculate and display employee and job information in a shop having a number of mechanic employees and having a number of different types of machines operated by said employees, comprising:
   (a) an employee-input station, a timekeeper station, and a management station,
   (b) a computer at said timekeeper station, a program in said computer operative to record and calculate employee hours spent on jobs from input data of the time employees clocked in and clocked out on each job each day, said program including recording of accumulated hours on each job to date and including calculating of job percentage completed to date thereby producing accumulated and calculated information on employees and jobs including job percentages completed and accumulated costs on each job, (c) a printer at said timekeeper station connected to said computer for printing recorded and calculated data, (d) first, second and third input keyboard terminals connected to said computer and located at said employee-input, timekeeper and management stations respectively, said terminal at said timekeeper station being a conventional general purpose computer terminal, said terminals at said employee-input and management stations being special purpose terminals limited primarily in input to employee clock-in and clockout each day and on each job and at least first, second, third and fourth cost class keys which can be associated with each employee clock-in and clock-out on each job and on different types of machines, (e) first, second and third computer monitors connected to said computer and located at said employee-input, timekeeper and management stations respectively, (f) said employee-input station including a listing of jobs by characters and a listing of employees by characters, said characters being capable of being input by the keys of said first and third input keyboard terminals, whereby clock-in and clock-out can be associated with employees and jobs, (g) said program including access control as to what of said accumulated and calculated information on employees and jobs can be displayed on said first and third monitors depending on the character identification of the employee operating the terminal, said access control including limiting access to said job percentages completed and accumulated costs on each job, and (h) said program associating different hourly costs with each of said first, second, third and fourth cost class keys in order to approximately calculate accumulated costs on each job, the action of said program being responsive to inputs by employees on said keyboard terminal at said employee-input station including employee identification, job identification, clock-in, clock-out and cost class keys.

2. A system to record, calculate and display employee and job information in a shop having a number of mechanic employees and having a number of different types of machines operated by said employees, comprising:

(a) an employee-input station, a timekeeper station and a management station, (b) a computer at said timekeeper station, a program in said computer operative to record and calculate employee hours spent on jobs from input data of the time employees clocked in and clocked out on each job each day, said program including recording accumulated hours on each job to date and including calculating of job percentage completed to date thereby producing accumulated and calculated information on employees and jobs including job percentages completed and accumulated costs on each job, (c) a printer at said timekeeper station connected to said computer for printing recorded and calculated data, (d) first, second and third input keyboard terminals connected to said computer and located at said employee-input, timekeeper and management stations respectively, said terminal at said timekeeper station being a conventional general purpose computer terminal, said terminals at said employee-input and management stations being special purpose terminals limited primarily in input to employee clock-in and clock-out each day and on each job, (e) first, second and third computer monitors connected to said computer and located at said employee-input, timekeeper and management stations resepctively, (f) said employee-input station including a listing of jobs by characters and a listing of employees by characters, said characters being capable of being input by the keys of said first and third input keyboard terminals, whereby clock-in and clock-out can be associated with employees and jobs, and (g) said program including access control as to what of said accumulated and calculated information on employees and jobs can be displayed on said first and third monitors depending on the character identification of the employee operating the terminal, the program control including limiting access to said job percentages completed and accumulated costs on each job, the action of said program being responsive to inputs by employees on said keyboard terminal at said employee-input station including employee identification, job identification, clock-in and clock-out.

3. A system to record, calculate and display employee and job information in a shop having a number of mechanic employees and having a number of different types of machines operated by said employees, comprising;

(a) an employee-input station, a timekeeper station, and a management station, (b) a computer at said timekeeper station, a program in said computer operative to record and calculate employee hours spent on jobs from input data of the time employees clocked in and clocked out on each job each day, said program including recording of accumulated hours on each job to date, (c) a printer at said timekeeper station connected to said computer for printing recorded and calculated data, (d) first, second and third input keyboard terminals connected to said computer and located at said employee-input, timekeeper and management stations respectively, said terminal at said timekeeper station being a conventional general purpose computer terminal at said employee-input station, said terminal being a special purpose terminal limited primarily in input to employee clock-in and clock-out each day and on each job and at least first, second third and fourth job cost class keys which can be associated with each employee clock-in and clock-out on each job and on different types of machines, (e) first, second and third computer monitors connected to said computer and located at said employee-input, timekeeper and management stations respectively, (f) said employee-input station including a listing of jobs by characters and a listing of employees by characters, said character being capable of being input by the keys of said first and third input keyboard terminals, whereby clock-in and clock-out can be associated with employees and jobs, and (g) said program associating different hourly costs with each of said first, second, third and fourth job cost class keys in order to approximately calculate accumulated costs on each job, the action of said program being responsive to inputs by employees on said keyboard terminal at said employee-input station including employee identification, job identification, clock-in, clock-out and cost class keys.

4. A system to record, calculate and display employee and job information in a shop having a number of mechanic employees and having a number of different types of machines operated by said employees, comprising:

(a) an employee-input station and a timekeeper station, (b) a computer at said timekeeper station, a program in said computer operative to record and calculate employee hours spent on jobs from input data of the time employees clocked in and clocked out on each job each day, said program including recording of accumulated hours on each job to date and including calculating of job percentage completed to date thereby producing accumulated and calculated information on employees and jobs including job percentages completed and accumulated costs on each job, (c) a printer at said timekeeper station connected to said computer for printing recorded and calculated data, (d) first and second input keyboard terminals connected to said computer and located at said employee-input and timekeeper respectively, said terminal at said timekeeper station being a conventional general purpose computer terminal, said terminal at said employee-input station being a special purpose terminal limited primarily in input to employee clock-in and clock-out each day and on each job and at least first, second, third and fourth cost class keys which can be associated with each employee clock-in and clock-out on each job and on different types of machines, (e) first and second computer monitors connected to said computer and located at said employee-input and timekeeper stations respectively, (f) said employee-input station including a listing of jobs by characters and a listing of employees by characters, said characters being capable of being input by the keys of said first input keyboard terminal, whereby clock-in and clock-out can be associated with employees and jobs, (g) said program including access control as to what accumulated and calculated information on employees and jobs can be displayed on said first monitor depending on the character identification of the employee operating the terminal, said access control including limiting access to said job percentages completed and accumulated costs on each job, and (h) said program associating different hourly costs with each of said second, third and fourth cost class keys in order to approximately calculate accumulated costs on each job, the action of said program being responsive to inputs by employees on said keyboard terminal at said employee-input station including employee identification, job identification, clock-in, clock-out and cost class keys.

5. A system to record, calculate and display employee and job information including employee time at work and time on particular jobs in an establishment having a number of employees and having a number of different types of operations engaged in by said employees, comprising:

(a) an employee-input station and a timekeeper station, (b) a computer at a second station, a program in said computer operative to record and calculate employee daily total hours and the jobs on which the hours are spent from input data as to employee identification, job identification and the time employees clocked in and clocked out on each job each day, (c) a printer at said timekeeper station connected to said computer for printing recorded and calculated data, (d) first and second input keyboard terminals connected to said computer and located at said employee-input and timekeeper stations respectively, said terminal at said timekeeper station being a conventional general purpose computer terminal, said terminal at said employee-input station being a special purpose terminal limited primarily in input to employee clock-in and clock-out on each job, (e) first and second computer monitors connected to said computer and located at said employee-input and timekeeper stations respectively, (f) said employee-input station including a listing of jobs by characters and a listing of employees by characters, said characters being capable of being input by the keys of said first input keyboard terminal, whereby clock-in and clock-out can be associated with employees and jobs, and (g) said program being operative to display questions on said monitor asking employees inputing data a series of questions to elicit employee identification, job identification and clock-in and clock-out.

6. The system of claim 5 in which said program includes calculation and accumulation of hours on each job to date and job percentage completed to date thereby producing accumulated and calculated information on employees and jobs including job percentages completed and accumulated costs on each job and said program including access control as to what of said accumulated and calculated data on employees and jobs can be displayed on said first monitor depending on the character identification of the employee operating the terminal, said access control including limiting access to said job percentages completed and accumulated costs on each job.

7. The system of claim 5 in which said first terminal includes several cost class keys which can be associated with each employee check-in and check-out on each job and different types of operations, said program associating different hourly costs with each of said several cost class keys in order to approximately calculate accumulated costs on each job.

8. A system to record, calculate and display employee and job information including employee time at work and time on particular jobs pertaining to an establishment having a number of employees and having a number of different types of job operations engaged in by said employees, comprising:

(a) an employee-input station for general employee input of time, employee identification and job identification, and timekeeper-function means capable of communicating with a computer and located a distance away from said employee-input station, (b) a computer connected to said station and to said timekeeper-function means and a program in said computer operative to record and calculate employee daily total hours and the jobs on which the hours are spent from input from general employees as to employee identification, job identification, and clock-in and clock-out on each job on which hours are spent, (c) a printer connected to said computer operative to print recorded and calculated data, (d) a special purpose input keyboard terminal connected to said computer and located at said employee input station and primarily limited in input capability to employee identification, job identification, and clock-in time and clock-out time, (e) a computer monitor connected to said computer and to said terminal and located at said employee-input station to display on said terminal information including display of data being input by said terminal, and (f) said program being operative to display questions on said monitor asking employees inputing data a series of questions to elicit employee identification, job identification and clock-in and clock-out.

9. The system of claim 8 in which said establishment is a shop having a number of mechanic employees and having a plant area and as office area and having a number of different types of machines operated by said employees located in said plant area and in which said employee-input station is located in said plant area and in which said timekeeper-function means is located in said office area.

10. The system of claim 8 in which employee-input station includes means displaying a listing of jobs by characters and a listing of employees by characters, said characters being capable of being input by the keys of said input keyboard terminal, whereby clock-in and clock-out can be associated with employees and jobs.

11. The system of claim 8 in which said program includes calculation and accumulation of hours on each job to date and job percentage completed to date thereby producing accumulated and calculated information on employees and jobs including job percentages completed and accumulated costs on each job and said program including access control as to what accumulated and calculated data on employees and jobs can be displayed on said monitor depending on the identification of the employee operating the terminal, said access control including limiting access to said job percentages completed and accumulated costs on each job.

12. The system of claim 8 in which said terminal includes at least several cost class keys that can be associated with each employee check-in and check-out on each job and different types of operations, said programs associating different hourly costs with each of said several cost class keys in order to approximately calculate accumulated costs on each job.

13. The system of claim 12 in which said establishment is a shop having a number of mechanic employees and having a plant area and an office area and having a number of different types of machines operated by said employees located in said plant area and in which said employee-input station is located in said plant area and in which said timekeeper-function means is located in said office area.

14. The method of recording and calculating information as to employee time at work and on particular jobs pertaining to a shop having a plant area and an office area separate therefrom and having a number of different types of machines in the plant area operated by said mechanic employee, comprising:

(a) providing a computer and inputing data into said computer directly from said plant area and directly by said mechanic employees who input by the keys of a shared keyboard employee identification, job identification, clock-in, clock-out, and job class among several job class categories that each define a different range of combined hourly costs of mechanics and machines, the mechanic employees inputing data at the first and last of their work shift and as work on various jobs start and stop during the work shift, and (b) calculating with the computer employee time at work and on particular jobs from the input from the mechanic employees.

15. The method of recording and calculating information as to employees time at work and on particular jobs pertaining to a shop having a plant area and having a number of mechanic employees working in the plant area and having a number of different types of machines in the plant area operated by said mechanic employees, comprising:

(a) providing a computer and inputing data into said computer directly from said plant area and directly by said mechanic employees who input by the keys of a shared keyboard employee identification, job identification, clock-in and clock-out at the first and last of the work shift and as work on various jobs starts and ends during the work shift, (b) calculating with the computer by computer program employee time at work and on particular jobs and job percentages completed from the input from the mechanic employees, and (c) the computer having a display asking employees inputing data a series of questions to elicit employee identification, job identification and clock-in and clock-out.

16. The method of recording and calculating information as to employee time at work and on particular jobs pertaining to an establishment having a work area and having a number of employees working in said work area and having a variety of different jobs, comprising:

(a) providing a computer and inputing data into said computer directly from said work area and directly by said employees who input in terms of employee identification, job identification, clock-in and clock-out at the first and last of the work shift and as work on various jobs starts and ends during the work shift, (b) calculating with the computer by computer program employee time at work and on particular jobs and job percentages completed from the input from said employees, and (c) the computer having a display asking employees inputing data a series of questions to elicit employee identification, job identification and clock-in and clock-out.

* * * * *